July 8, 1941.   J. W. HATCH   2,248,171
BRAKING MECHANISM
Filed Feb. 13, 1939
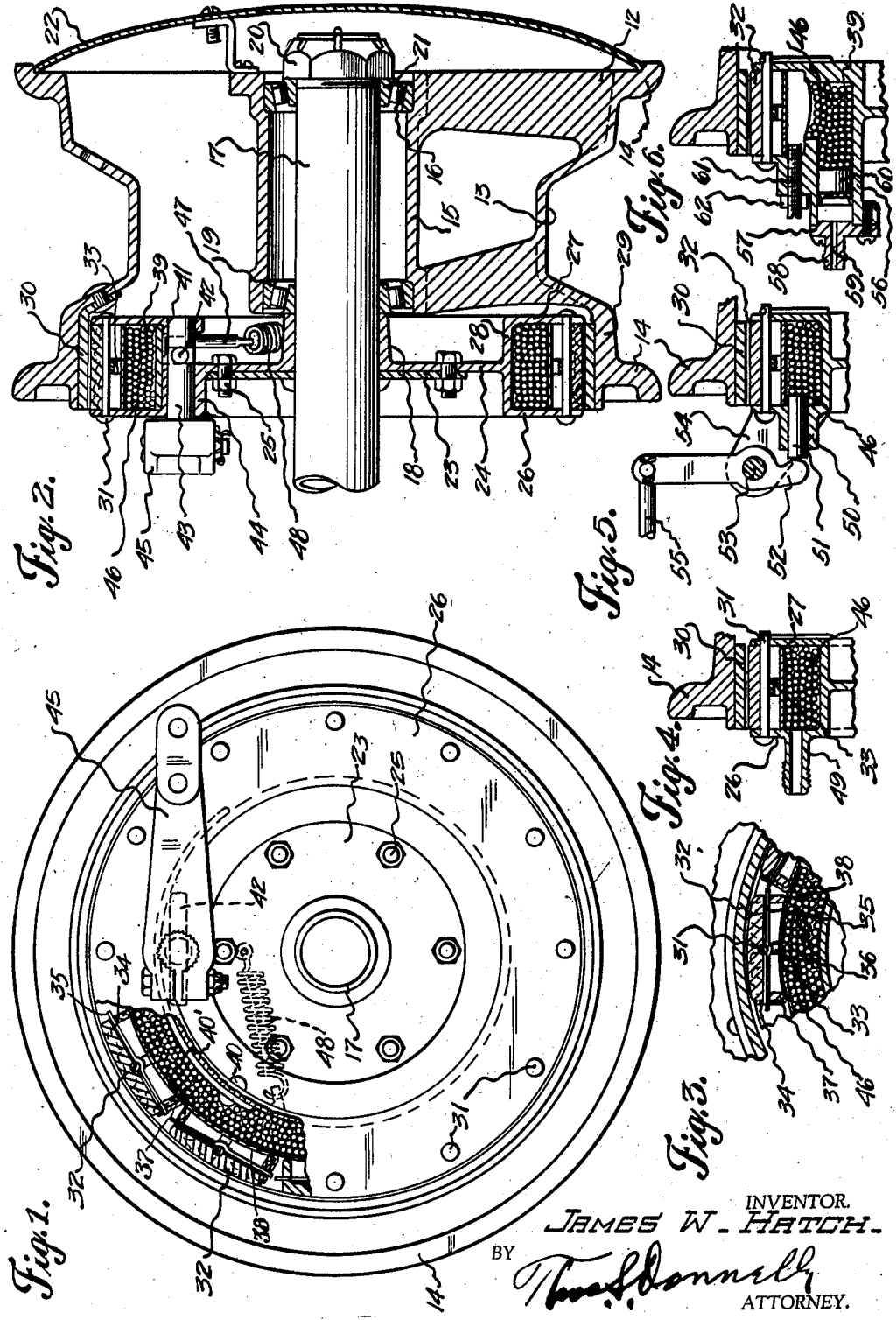
INVENTOR.
JAMES W. HATCH.
BY
ATTORNEY.

Patented July 8, 1941

2,248,171

UNITED STATES PATENT OFFICE 2,248,171

BRAKING MECHANISM

James W. Hatch, Detroit, Mich., assignor to The Firestone Tire & Rubber Company, Akron, Ohio, a corporation of Ohio Application February 13, 1939, Serial No. 256,118

12 Claims. (Cl. 188—78)

My invention relates to a new and useful improvement in a braking mechanism adapted primarily for use on vehicle wheels and particularly adapted for use on landing wheels of an airplane. It will appear obvious, however, that the braking mechanism may be utilized for braking on any rotating body. It is an object of the present invention to provide a braking mechanism in which an expandable frictional member may be expanded through the application of pressure to a plurality of operable members such as small balls which are enclosed in a confined space so that upon being crowded together, they may press against the expandable member and force it into braking position.

It is another object of the invention to provide a breaking mechanism of this class which will be simple in structure, economical of manufacture, compact, durable, easily and quickly operated and highly efficient in use.

It is another object of the invention to provide a braking mechanism of this class in which a plurality of separable braking shoes may be expanded outwardly into braking position and in which a maximum of heat transference will be effected to effect increased efficiency of the device and to provide a long life.

Other objects will appear hereinafter.

The invention in its structure and method of operation will appear in the description given and in which reference will be had to the accompanying drawing forming a part of this specification and in which, Fig. 1 is a rear elevational view, partly in section, of the invention showing it applied to a wheel;

Fig. 2 is a central vertical sectional view of the invention applied to a wheel;

Fig. 3 is a fragmentary central sectional view illustrating the shoe mounting used in the invention;

Fig. 4 is a central sectional view through an operating part of a modified form of the mechanism;

Fig. 5 is a central sectional view through another form of an operating mechanism, and Fig. 6 is a central sectional view through another form of an operating mechanism.

In the drawing I have illustrated the invention used with a wheel 12 having the recessed portion 13 and the flange 14 for retaining a tire in position thereon. The hub 15 is journaled on bearings 16 which are mounted on a stationary shaft 17. Fixedly mounted on the shaft 17 is a hub 18 against which one of the bearing rings 19 engages so that when the nut 20 is threaded against the bearing ring 21 the bearings will be locked into position and the wheel secured journaled on the bearings. A hub cap 22 is mounted on the outer face of the wheel.

Welded or otherwise secured to the shaft 17 is a disk 23 to which the disk 24 projecting outwardly from the hub 18 is attached by the bolts 25. The disk 24 has on its outer end an integral channel-shaped member having side walls 26 and 27 and a base 28 to provide a circular trough-shaped or channel-shaped structure. A circular flange 29 extends outwardly from the inner face of the wheel on the inner surface of which is secured the brake lining 30.

Extending through and between the side walls 26 and 27 inwardly from the outer edges thereof are pins or rivets 31. In the invention I use a plurality of shoes for braking purposes. These shoes comprise a box-like structure having an arcuate face 32, projecting centrally inwardly from which are the bifurcated spaced lugs 33. The end walls of the braking shoes are slotted as at 34 and extending through these oppositely disposed slots in the walls and between the lugs 33 is a spring bar 35 formed from flat leaf spring and having the semi-circular recess 36 formed at its transverse medial line for reception of the pin 31. This spring bar 35 also projects through the angularly turned end 37 of the metallic shield 38, the metallic shield 38 overlapping the corresponding shield of each adjacent shoe to form circumferentially expansible means at the bases of the brake shoes. In this manner these shoes are mounted on the pins 31 and the spring bar 35 which serve to normally retain the shoes moved radially inwardly into operative position. When the shoes are pressed outwardly the outer faces 32 thereof will engage the inner face of the brake lining 30 and provide the desired frictional contact. These shield plates 38 serve to form a circular closure of the space 39 in the channel positioned inwardly from these plates.

Secured at one end to the bottom 28 by means of a rivet 40 is a resilient plate 40'. Formed in the bottom 28 is a slot 41 through which is adapted to be projected a presser pin 42 projecting radially outwardly from the stub shaft 43 which is journaled in the boss 44 formed on the outer portion of the bottom 28. Fixedly mounted on this stub shaft 43 is a rocker arm 45 adapted upon rocking in one direction for projecting the pin 42 through the slot 41 and forcing the plate 40' upwardly at its free end away from the bottom 28 so as to crowd the balls 46 which are positioned in the compartment or space 39. By pressing the free end of the plate 40' inwardly the space in which the balls are positioned is reduced and the balls, being crowded together, will force the shoes outwardly into engaging position with the brake lining 30.

Extending radially from the stub shaft 43 is a pin 47 to which is attached one end of a spring 48, the other end being secured to the disk 24 so that when the rocking pressure on the arm 45 is released the arm will be rocked to its normal position permitting the free end of the plate 40' to resume its normal position and lie flat upon the bottom 28. The metallic shield is associated with the shoes and their mountings together with the metallic side walls 26 and 27 and the balls 46 serve as a large heat conducting area to rapidly remove the heat away from the shoes as the same is generated.

In Fig. 4 I have shown a construction in which a nipple 49 is formed on the wall 26 through which suitable pressure may be directed against the balls 46 for crowding the same together.

In Fig. 5 I have shown a guide boss 50 in which is mounted a plunger 51 engageable by one end 52 of a lever rockably mounted on the pin 53 projected through the lug 54. The opposite end of the lever is connected to a rod 55 through which rocking movement may be transmitted for forcing the plunger 51 inwardly to crowd the balls when desired.

In Fig. 6 I have shown a cylinder 56 formed on one of the side walls closed by a plate 57 having a nipple 58 projecting outwardly therefrom. A bore 59 is formed in this nipple through which liquid may be delivered to effect a movement of the piston 60 which will operate as the crowding agent. In this form, also, I have shown a threaded rod 61 projectable into the space 39 which will serve as a means of adjustment, a lock nut 62 being threaded on this rod. It will be noted that in all of the forms except in the form illustrated in Fig. 1 and Fig. 2 the thrust delivered to the balls is axially of the structure and is a direct thrust by the thrust delivering agent. It is believed obvious that the part 29 may be considered a brake drum with its inner surface considered the friction surface. This surface is illustrated as covered with a brake lining but it is obvious that this lining may be dispensed with if desired.

As shown in Fig. 4, the shield members 38 are of the same width as the space between the walls 26 and 27 so that this row of shield members forms a circumferential closure of the channel and together with the side walls and the part 28 the chamber 39 is formed.

With a brake constructed in this manner the various advantages are obtained and a highly efficient device provided.

Many modifications embodying in the invention herein set out will suggest themselves but it is the intention in the claims appended hereto to cover such modifications as embody the invention herein set forth.

What I claim as new is:

1. A braking mechanism of the class described, comprising: a rotatable drum; a stationary member positioned within said drum and having a circular channel formed on its periphery open at the outer side and terminating adjacent the inner surface of said drum; a plurality of separate brake shoes rockably mounted in said channel adjacent the outer side thereof and radially movable inwardly and outwardly of said stationary member and adapted upon radial outward movement for frictionally engaging said brake drum; a shield member carried by each of said shoes and extending across the inner side of the shoe on which said shield member is mounted and overlapping the adjacent end of the adjacent shoe, said shields forming a closure in said channel for forming with the bottom thereof a chamber; a plurality of disconnected inter-engaging thrust members substantially filling said chamber; axially movable means for delivering a thrust to said thrust members and reducing the space in said chamber occupied by said thrust members for forcing said thrust members against the inner sides of said shoes and forcing the same radially outwardly.

2. A braking mechanism of the class described, comprising: a rotatable drum; a stationary member positioned within said drum and having a circular channel formed on its periphery open at the outer side and terminating adjacent the inner surface of said drum; a plurality of separate brake shoes rockably mounted in said channel adjacent the outer side thereof and radially movable inwardly and outwardly of said stationary member and adapted upon radial outward movement for frictionally engaging said brake drum; a shield member carried by each of said shoes and extending across the inner side of the shoe on which said shield member is mounted and overlapping the adjacent end of the adjacent shoe, said shields forming a closure in said channel for forming with the bottom thereof a chamber; a plurality of disconnected inter-engaging thrust members substantially filling said chamber; axially movable means for delivering a thrust to said thrust members and reducing the space in said chamber occupied by said thrust members for forcing said thrust members against the inner sides of said shoes and forcing the same radially outwardly; and resilient means associated with each of said shoes for moving the same radially inwardly upon release of the outward thrust delivered thereto.

3. A mechanism of the class described, comprising: a rotatable brake drum; a stationary supporting member positioned in said drum and mounted concentrically thereof; a circular channel-forming member on said supporting member, the channel thereof opening at the outer side thereof; a plurality of separate circumferentially arranged, spaced brake shoes mounted in said channel adjacent the outer side thereof and adapted for radial inward and outward movement and adapted upon radial outward movement for frictionally engaging said brake drum; a spring associated with each of said shoes for normally resisting radial outward movement of the same; cooperating means carried by each of said shoes for forming with the bottom of said channel a closed chamber, said cooperating means extending circumferentially radially inwardly of said shoes; a plurality of disconnected inter-engaging thrust members positioned in said chamber and substantially filling the same; and axially movable means insertable into said chamber for occupying a portion of the same and delivering a thrust to said engagement members and forcing the same into pressing relation with said cooperating means for forcing said shoes radially outwardly.

4. A mechanism of the class described, comprising: a rotatable brake drum; a stationary supporting member positioned in said drum and mounted concentrically thereof; a circular channel forming member on said supporting member, the channel thereof opening at the outer side thereof; a plurality of separate circumferentially arranged spaced brake shoes mounted in said channel adjacent the outer side thereof and adapted for radial inward and outward movement and adapted upon radial outward movement for frictionally engaging said brake drum; a spring associated with each of said shoes for normally resisting radial outward movement of the same; cooperating means carried by each of said shoes for forming with the bottom of said channel a closed chamber, said cooperating means extending circumferentially radially inwardly of said shoes; a plurality of disconnected inter-engaging thrust members positioned in said chamber and substantially filling the same; and means for reducing the volume of said chamber and exerting pressure on said thrust members for forcing the same into pressing relation with said cooperating means for forcing said shoes radially outwardly.

5. A brake mechanism of the class described, comprising: a brake drum having a circular engagement surface; a braking mechanism positioned in said brake drum and comprising a stationary supporting member; a circumferential channel-bearing member on said supporting member, the channel thereof opening at its outer side; a plurality of independently mounted rockable brake shoes mounted in said channel adjacent the outer side thereof, said shoes being arranged in circumferentially spaced relation; means positioned radially inwardly of said shoes for forming with the bottom of said channel a closed chamber, said means being radially movable under pressure; a plurality of separate contacting engaging members in said chamber and substantially filling the same; and axially movable means insertable into said chamber for occupying a portion of the same and reducing the space available for said contact members and exerting pressure on said contact members for forcing the same into position for moving said shoes radially outwardly.

6. A brake mechanism comprising a rotatable drum, a stationary member having an annular channel formed therein opening outwardly of the brake, a plurality of independent brake shoes, means mounting said brake shoes in the outer portion of said annular channel, separate shield means associated with the inner surface of each of said brake shoes and overlapping the end of one of the adjacent brake shoes to form a continuous shield around said channel, said shield means combining with the lower portions of said channel to form a chamber extending around said stationary member, thrust delivering means positioned in said chamber, and means for delivering a thrust to said thrust delivering means for forcing said shield outwardly.

7. A brake mechanism comprising a rotatable drum, a stationary member having an annular channel formed therein opening outwardly of the brake, a plurality of independent brake shoes mounted in the outer portion of said annular channel, shield means associated with the inner surface of each of said brake shoes and overlapping the end of one of the adjacent brake shoes to form a continuous radially movable shield around said channel, thrust delivering means positioned in said channel between the base thereof and said shield means, and means for delivering a thrust to said thrust delivering means for forcing said shield outwardly.

8. A brake mechanism as in claim 7 in which said means for delivering a thrust to said thrust delivering means comprises an arcuate resilient plate positioned in said channel and movable radially outwardly thereof.

9. A brake mechanism as in claim 7 in which said means for delivering a thrust to said thrust delivering means comprises axially movable means insertable into said channel for occupying a portion thereof and forcing said shield outwardly.

10. A brake mechanism comprising a rotatable drum, a stationary member having an annular channel formed therein opening outwardly of the brake, a plurality of separate arcuate brake shoes, means mounting said brake shoes independently in the outer portion of said annular channel, separate shield means positioned radially inwardly of each of said brake shoes and overlapping a corresponding end of one of said brake shoes immediately adjacent same to form a continuous expandible shield around said channel, thrust delivering means positioned in said channel between the base thereof and said shield means, and means for exerting a force upon said thrust delivering means to force same outwardly against said shield means, said brake shoes being separately removable from said stationary member whereby one of said brake shoes can be removed from the brake mechanism without breaking the continuous shield formed around said channel.

11. A brake mechanism as in claim 6 in which means insertable into said annular channel are provided for varying the volume of the chamber formed to receive said thrust delivering means.

12. A brake mechanism comprising a drum, a member having an annular channel formed therein opening outwardly of the brake positioned within said drum, said drum and said member being rotatable relative to each other, a plurality of brake shoes separately mounted in said channel for radial movement relative thereto, circumferentially expansible means positioned at the bases of said brake shoes, thrust delivering means interposed between the base of said annular channel and said circumferentially expansible means, an arcuate member secured at one end thereof to the base of said annular channel, and means for moving the free portion of said arcuate member radially outwardly, said arcuate member bearing directly upon said thrust delivering means whereby a radially outwardly directed force is exerted upon said brake shoes to move them outwardly towards said drum when said arcuate member is moved outwardly relative to said channel.

JAMES W. HATCH.